July 15, 1969  L. S. SUOZZO  3,455,527

VIBRATION ARRESTOR

Filed July 24, 1967

INVENTOR.
LEONARD S. SUOZZO
BY *F. J. Pisarra*
ATTORNEY

United States Patent Office 3,455,527
Patented July 15, 1969

3,455,527
VIBRATION ARRESTOR
Leonard S. Suozzo, 366 Maple Hill Drive,
Hackensack, N.J. 07601
Filed July 24, 1967, Ser. No. 655,592
Int. Cl. F16l 3/00, 3/08
U.S. Cl. 248—54
9 Claims

ABSTRACT OF THE DISCLOSURE

Apparatus for arresting shock and vibration forces created in equipment, such as high temperature piping, the apparatus including a first member defining a groove and adapted to be connected to a stationary support, a second member registering with and slidable along the groove and adapted to be connected to the piping, coupling means joining the members and including a disk spring exerting a force which urges the members toward each other whereby to resist relative sliding movement of the members, a pair of relatively slidable wedge devices between the second member and the disk spring, and means responsive to variations in the temperature of the piping for effecting corresponding sliding movement of one of the wedge members to thereby alter the force exerted by the disk spring.

Background of the invention

This invention relates in general to apparatus for effectively withstanding and absorbing sway and vibration forces which may be created in various types of equipment during normal use. The invention pertains, in one of its more specific aspects, to apparatus for arresting sway and/or vibration forces created in piping or other equipment, which is subject to movement due to changes in thermal conditions, while permitting normal movement thereof.

Vibration arrestors according to this invention have wide application and are especially useful as adjuncts to various types of piping and equipment including, for example, piping employed in electric power plants and other environments. As is well known, such piping is subject to thermal movement as the result of expansion or contraction thereof due to temperature changes in the material of the piping. The piping may at times be subjected to shock and vibration forces created by quick closing valves, water hammer and the like. The piping may also be subjected to sway forces caused by wind pressures and vibrations and sway resulting from earthquakes or other disturbances.

The arrestor of this invention is intended to and does, in fact, effectively check vibration and shock and prevent swaying in various items of equipment, such as piping used in power plants or other locales.

Summary of the invention

The present arrestor comprises a first member, which is adapted to be pivotally connected to a stationary support, and a second member, which is adapted to be connected to equipment, such as piping. The second member bears against the first member and is slidable relative thereto along a predetermined path. The arrestor also comprises coupling means joining the first member to the second member and including spring means, preferably a disk spring, which exerts a force urging the members toward each other and means for adjusting the loading on the disk spring. The parts are so arranged that the force exerted by the disk spring creates sufficient frictional resistance between the members to releasably lock the members and thereby prevent swaying and check vibration and shock in the piping.

A form of the invention that may be advantageously employed with piping which is subject to thermal movement additionally comprises a pair of wedge devices which are positioned between the second member and the disk spring. The wedge devices are arranged in face-to-face relation and taper in opposite directions. One of the wedge devices is slidable relative to the other. The arrestor is provided with means responsive to variations in the temperature of the piping for effecting corresponding movement of the slidable wedge relative to the other wedge, thereby correspondingly varying the loading on the disk spring and the frictional resistance between the members. The temperature responsive means preferably comprises a metal rod connected at one end to a pipe strap, which is in intimate contact with the piping, and at its other end to the slidable wedge device. The rod has a coefficient of expansion that is substantially greater than that of the strap.

This invention has for its primary object the provision of improved apparatus for arresting shock, vibration and other forces created in various types of equipment including high temperature piping employed in power plants.

Another object of this invention is to provide a sway and vibration arrestor for use with piping that transmits high temperature fluid, the arrestor having its parts so constructed and arranged as to allow the piping to move freely to its "hot position" and cause the arrestor to become locked, thereby preventing swaying and checking vibration. The arrestor, on cooling of the piping, becomes unlocked, allows the piping to return to its normal "cold position" and prevents overstressing under normal conditions.

A further object o fthis invention is to provide a simple friction type arrestor that is adapted, in use, to eliminate or minimize the effects of shock and vibration forces in piping or other equipment having little or no thermal movement.

The invention has for a still further object the provision of an arrestor of the type indicated that simple in design; that is sturdy and durable in construction; that is reasonable in manufacturing and installation costs; and that is capable of operating in an efficient, dependable and trouble-free manner for long periods of time.

The enumerated objects and additional objects, together with the advantages of the invention, will be readily apparent to persons trained in the art from the following detailed description and the accompanying drawing which respectively describe and illustrate two embodiments of the invention.

Brief description of the drawing

In the drawing, wherein like reference numerals identify corresponding parts in the several views.

Description of the preferred embodiments

Figure 1:
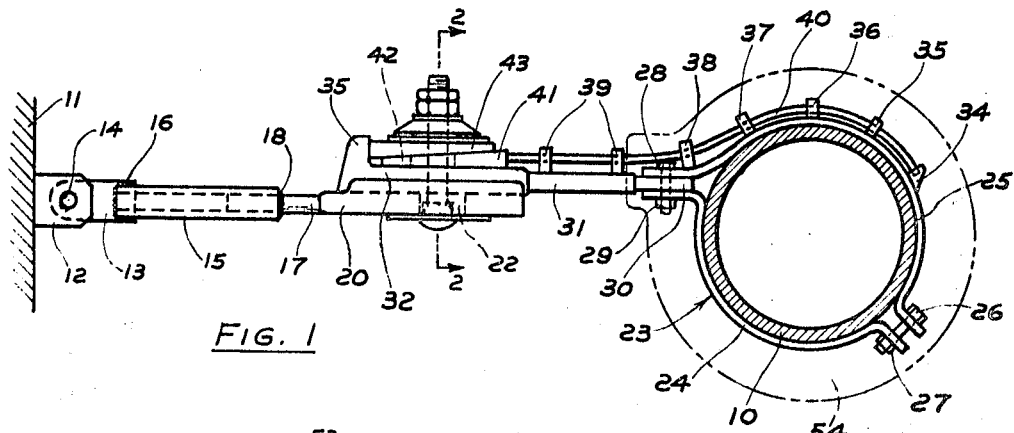
FIG. 1 is a side elevation view of one embodiment of the invention operatively connected to a stationary support and to a length of piping which is shown in cross section.
Figure 2:
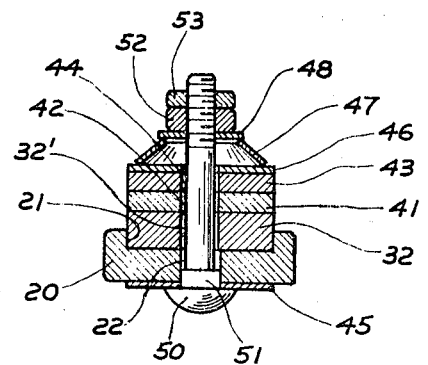
FIG. 2 is a view in enlargement taken along line 2—2 of FIG. 1.

Referring initially to FIGS. 1 and 2 of the drawing, the embodiment of the arrestor illustrated therein is operatively connected to a section of piping 10 and to a stationary support 11, as will be described. The piping 10 is of the above-mentioned high temperature type commonly employed in power plants. The stationary support 11 may be a building wall or a suitable fixed vertical column.

The arrestor shown in FIGS. 1 and 2 comprises a bracket 12 which is anchored to the stationary support by bolts or the like (not shown). A plate 13 is pivotally connected to bracket 12 through the medium of a pin 14. A length of tubing 15 is secured to the plate by welding, as indicated at 16. A rod 17 is telescopically positioned in the tubing and, at the time of installation, is secured to the tubing by a weldment 18.

Secured to the outer end of rod 13, preferably by welding, is a first member or block 20 which is formed with an upper groove 21 and is provided with a rectangular slot 22. Member 20 is made of a suitable metal, preferably cast steel.

Circumscribing piping section 10 is a pipe strap 23 which consists of parts 24 and 25, each having an arcuate portion that is in intimate contact with the piping outer surface. One end of pipe strap part 24 is connected to an end of pipe strap part 25 by at least one bolt 26 and nut 27. The other ends of the pipe strap parts are connected by at least one bolt 28 and nut 29. Interposed between the other ends of the pipe strap parts and coupled thereto by bolt 29 is a plate 30. A rod 31 is connected at one end to plate 30 and at its other end to a second member or block 32.

Member 32 has an integral upstanding lug or ear 33, which serves as a stop, and is provided with a through opening 32'. Member 32 registers with groove 21 and is slidable relative to member 20 along the path defined by the groove. The contiguous surfaces of members 20 and 32 are roughened to enhance frictional resistance to relative sliding movement therebetween.

Affixed to pipe strap part 25 are a block 34 and a plurality of spaced guide clips 35, 36, 37 and 38. Affixed to rod 31 is a pair of similar spaced guide clips 39. Each guide clip defines a through opening (not shown). A cylindrical rod 40 is secured at one end to block 34 and extends through the openings in guide clips 35 through 39. The other end of the rod is secured to a first wedge device 41 which bears against the upper surface of member 32 and which is provided with a slot 42. Rod 40 is made of a metal having a coefficient of expansion that is substantially greater than that of pipe strap 23. A recommended metal for the material of the rod is brass.

A second wedge device 43 bears against the upper surface of wedge device 41 and is formed with a through opening 44. One side of wedge device 43 bears against stop lug 33. It will be observed from an examination of FIG. 1 that wedge device 41 is slidable relative to member 32 and wedge device 43.

Positioned beneath and bearing against member 20 is a lower washer 45. Mounted on wedge device 43 are an intermediate washer 46, a disk spring 47 and an upper washer 48, which are arranged in the order named.

The above-described parts are connected, as shown in FIG. 2, by a bolt 50 which extends upwardly through washer 45, slot 22 in member 20, opening 32' in member 32, slot 42 in wedge device 41 and opening 44 in wedge device 43. Bolt 50 is formed, adjacent its head, with a square portion 51 which registers with slot 22 whereby to prevent rotation of the bolt relative to member 20. The bolt is equipped with a nut 52, which bears against washer 48, and a lock nut 53.

As is indicated in FIG. 1, piping 10, pipe strap 23 and the portion of rod 40 which is carried by the pipe strap are enveloped in a sheath 54 of a suitable heat insulating material. The parts are so arranged that the temperature of rod 40 is essentially the same as that of piping section 10 in use.

The parts of the arrestor are in the relative postition shown in FIG. 1 when the arrestor is installed and the piping 10 is in its "hot position." Such "hot position" is assumed, for the purposes of this description, to be to the left of the piping's "cold position" (not shown). However, weldment 18 for joining rod 17 to tube 15 is not made and disk spring 47 is not loaded until the piping section has attained its "hot position." At that time, weldment 18 is made and disk spring 47 is loaded through the medium of bolt 50 and nut 52 to an extent requisite to create sufficient frictional resistance between members 20 and 32 to lock the arrestor whereby to prevent swaying and check vibration in the piping.

During cooling of the piping, rod 40 contracts and moves wedge device 41 toward the right as allowed by its slot 42 and bolt 50. This reduces the loading on the disk spring and correspondingly decreases the frictional resistance between members 20 and 32, thereby allowing the piping to move toward the right to its "cold position." The parts are so arranged that, when the piping is in its "cold position," bolt 50 bears against the portion of member 20 which defines the right end of slot 22, as viewed in FIG. 1, and thus limits movement of the piping toward the right.

Figure 3:
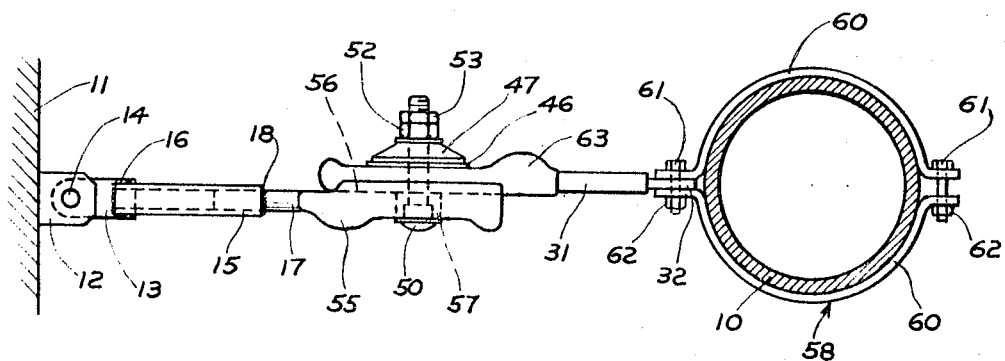
FIG. 3 is a view corresponding to FIG. 1 and illustrates another embodiment of the invention.

Reference is now had to FIG. 3 for an understanding of a second embodiment of the invention which is similar in a number of respects to the construction shown in FIGS. 1 and 2. The embodiment shown in FIG. 3 is intended and recommended for employment with piping or other equipment that is subject to little or no thermal movement in use.

The arrestor illustrated in FIG. 3 includes a first member 55 similar to member 20 and formed with a groove 56 and a slot 57 corresponding, respectively, to groove 21 and slot 22 of member 20. Piping 10 is equipped with a pipe strap 58 including a pair of identical parts 60 which are joined by bolts 61 and nuts 62. The pipe strap is connected to a second member 63 which is similar to earlier described member 32. Member 63 cooperates with and functions relative to member 55 in the same manner as member 32 with respect to member 20.

Inasmuch as piping 10 is not subject to appreciable thermal movement, the construction shown in FIG. 3 is devoid of wedge devices 41 and 43 and rod 40 which are essential elements of the construction shown in FIGS. 1 and 2.

Based on the foregoing, it is believed that the construction, operation, objects and advantages of my present invention will be readily comprehended by persons skilled in the art, without further description. It is to be clearly understood, however, that various changes in the constructions described above and illustrated in the drawing may be made without departing fom the scope of the invention, it being intended that all matter contained in the description or shown in the drawing shall be interpreted as illustrative only and not in a limiting sense.

I claim:

1. An arrestor for protecting equipment, such as piping, against shock and vibration forces, comprising:
   (a) a first member adapted to be connected to a stationary support;
   (b) a second member bearing against the first member, slidable relative to the first member along a rectilinear path and adapted to be connected to the piping; and
   (c) coupling means joining the first member to the second member and including:
       (1) spring means exerting a force urging the members toward each other, the direction of such force being substantially normal to said path of sliding movement; and
       (2) means for adjusting the loading on the spring means.

2. An arrestor according to claim 1 wherein the spring means comprises a disk spring.

3. An arrestor according to claim 1 wherein the first member is adapted to be pivotally connected to the support.

4. An arrestor for protecting equipment, such as piping, against shock and vibration forces, comprising:
   (a) a first member adapted to be connected to a stationary support;

(b) a second member bearing against the first member, slidable relative to the first member along a predetermined path and adapted to be connected to the piping;

(c) coupling means joining the first member to the second member and including:
  (1) spring means exerting a force urging the members toward each other; and
  (2) means for adjusting the loading on the spring means;

(d) a pair of wedge-like devices between the second member and the spring means, said wedge-like devices being disposed in face-to-face relation and tapering in opposite directions, one of the wedge-like devices being slidable relative to the other; and (e) means responsive to variations in the temperature of the piping for effecting corresponding sliding movement of said one of the wedge-like devices relative to the other.

5. An arrestor according to claim 4 wherein the last-mentioned means comprises a strap adapted to engage and form intimate contact with the piping and a rod connected to the strap and having a coefficient of expansion that is substantially different from that of the strap.

6. An arrestor according to claim 5 wherein the rod is secured at one end to the slidable wedge-like device and is adapted to be connected at its other end to the piping by the strap.

7. An arrestor according to claim 5 wherein the rod has a coefficient of expansion which is substantially greater than that of the strap.

8. An arrestor according to claim 4 wherein the coupling means includes a connector which extends through the members, the wedge-like devices and the spring means.

9. An arrestor according to claim 8 wherein:
  (a) one of the members defines a groove;
  (b) the other member registers with the groove and is slidable therealong; and
  (c) the spring means comprises a disk spring.

References Cited

UNITED STATES PATENTS

| | | | |
|---|---|---|---|
| 992,338 | 5/1911 | Carpenter et al. | 248—74 |
| 1,012,063 | 12/1911 | Davis | 248—74 X |
| 2,339,565 | 1/1944 | Goldberg | 248—59 X |
| 2,372,214 | 3/1945 | Loepsinger | 248—54 X |
| 2,580,625 | 1/1952 | Waltz | 211—89 |
| 2,605,387 | 7/1952 | Brodie | 248—62 X |

CHANCELLOR E. HARRIS, Primary Examiner

U.S. Cl. X.R.

248—74